United States Patent [19]

Kachi

[11] Patent Number: 5,430,636
[45] Date of Patent: Jul. 4, 1995

[54] INVERTER APPARATUS AND INVERTER CONTROLLING METHOD HAVING FAULT PROTECTION

[75] Inventor: Mitsuyasu Kachi, Aichi, Japan

[73] Assignee: Mitsubishi Denki Kabushiki Kaisha, Tokyo, Japan

[21] Appl. No.: 8,179

[22] Filed: Jan. 25, 1993

[30] Foreign Application Priority Data

May 29, 1992 [JP] Japan .................................. 4-138823

[51] Int. Cl.⁶ ........................................... H02H 7/122
[52] U.S. Cl. ........................................ 363/58; 363/55
[58] Field of Search ................... 363/50, 55, 56, 58, 363/95, 98, 131, 132; 361/18, 42, 47, 88

[56] References Cited

U.S. PATENT DOCUMENTS

| | | |
|---|---|---|
| 3,795,858 | 3/1974 | Fletcher et al. ................. 324/57 R |
| 4,853,835 | 8/1989 | Furuhashi ............................. 363/58 |
| 4,916,598 | 4/1990 | Takase et al. ........................ 363/55 |
| 4,926,306 | 5/1990 | Ueda et al. .......................... 363/58 |
| 5,127,085 | 6/1992 | Becker ................................ 361/18 |
| 5,177,428 | 1/1993 | Hirose et al. ........................ 363/58 |
| 5,235,487 | 8/1993 | Gruning ............................... 361/18 |

FOREIGN PATENT DOCUMENTS

| | | | |
|---|---|---|---|
| 0277849 | 7/1987 | European Pat. Off. ...... | H02H 7/122 |
| 3601160 | 7/1987 | Germany ....................... | H02H 7/122 |
| 2168813 | 6/1990 | Japan ............................ | H02H 7/122 |
| 288478 | 7/1990 | Japan ............................ | H02M 7/48 |
| 2060299 | 4/1981 | United Kingdom .......... | H02M 1/18 |
| 2084357 | 4/1982 | United Kingdom .......... | G05F 5/00 |
| 8203137 | 9/1992 | WIPO ........................... | G08B 21/00 |

OTHER PUBLICATIONS

Patent Abstracts of Japan, vol. 5, No. 86 (E-60) (785) 5 Jun. 1981, Protective Circuit for Direct Current Overvoltage of Inverter.

Primary Examiner—Steven L. Stephan
Assistant Examiner—Matthew V. Nguyen
Attorney, Agent, or Firm—Sughrue, Mion, Zinn, Macpeak & Seas

[57] ABSTRACT

An inverter apparatus and an inverter controlling method for judging a P-N impedance fault, a ground fault or a transistor fault by respective predetermined judging circuits according to either a voltage developed across a smoothing capacitor or the rate of change in the voltage while the smoothing capacitor is being charged. The charging of the capacitor is carried out via a resistor circuit or before the resistor circuit is short-circuited by a relay.

12 Claims, 5 Drawing Sheets

INVERTER APPARATUS AND INVERTER CONTROLLING METHOD HAVING FAULT PROTECTION

FIELD OF THE INVENTION

The present invention relates to an inverter apparatus and an inverter controlling method having protective functions. Specifically, the inverter is capable of protecting against impedance faults, ground faults and transistor faults.

BACKGROUND OF THE INVENTION

FIG. 6 shows a conventional inverter apparatus. The numeral 1 indicates a three-phase alternating-current power supply, 2 indicates a rectifier circuit for rectifying three-phase alternating currents which are input to the rectifier, and 3 indicates a three-phase switch circuit, e.g., a three-phase main relay, having contacts 3a, 3b and 3c for connecting or disconnecting the outputs of the three-phase alternating-current power supply 1 and the inputs of the rectifier circuit 2. Reference numeral 4 indicates a smoothing capacitor circuit for smoothing the rectification outputs of the rectifier circuit 2. Reference numeral 5 indicates a semiconductor switching circuit which receives direct currents smoothed by the smoothing capacitor 4 and constitutes the output section of a PWM (pulse width modulation) circuit that outputs the PWM-modulated three-phase alternating currents.

The semiconductor switching circuit 5 includes an upper arm transistor 5a and a lower arm transistor 5b. These form a U phase. The switching circuit 5 also includes an upper arm transistor 5c and a lower arm transistor 5d, forming a V phase. Finally, the switching circuit includes an upper arm transistor 5e and a lower arm transistor 5f forming a W phase. Flywheel diodes 5g, 5h; 5i, 5j; 5k and 5l are connected in antiparallel with said upper and lower arm transistors 5a, 5b in the U phase; 5c, 5d in the V phase; and 5e, 5f in the W phase, respectively. The transistors 5a to 5f are switched on/-off under the control of a control signal output from a switch controlling means, for example, a switch control section (not shown). Three-phase alternating currents are output from the connecting points of the upper and lower arm transistors in the three phases. The semiconductor switching circuit 5 and the switching control section constitute the PWM circuit.

Reference numeral 6 indicates an overcurrent detector circuit for detecting an excess current by monitoring the magnitude of a current which is input to the semiconductor switching circuit 5 after it has been rectified by the rectifier circuit 2 and smoothed by the smoothing capacitor 4. Reference numeral 7 indicates a motor which is rotated by the PWM-modulated three-phase alternating currents output from the semiconductor switching circuit 5.

Reference numeral 8 indicates a two-phase switch circuit, for example, a two-phase relay, having two contacts 8a and 8b. Reference numeral 9a indicates a resistor connected in series with the contact 8a of the two-phase relay 8, and 9b, a resistor connected in series with the contact 8b of the two-phase relay 8.

A series combination of the contact 8a and the resistor 9a is connected in parallel with the contact 3a of the three-phase main relay 3, and a series combination of the contact 8b and the resistor 9b is connected in parallel with the contact 3b of the three-phase main relay 3.

A circuit comprising the rectifier circuit 2 and the smoothing capacitor 4 is referred to as a converter.

The operation of the protective functions of the inverter apparatus of the prior art shown in FIG. 6 will now be described.

First, before the three-phase main relay 3 is switched on, the two-phase relay 8 is switched on by the switching control section (not shown). Two-phase alternating currents are input to the rectifier 2 via the resistors 9a, 9b and rectified voltages output from the rectifier circuit 2 are applied across the smoothing capacitor 4, thereby gradually charging the smoothing capacitor 4. When the charging is complete in a predetermined period of time, the three-phase main relay 3 is turned on by the switching control section. It should be noted that at this point, the transistors of the semiconductor switching circuit 5 are all turned off.

If an excess current has been detected by the detection output of the overcurrent detector 6 immediately after the three-phase main relay 3 has been turned on, it is judged that a short circuit between the positive-voltage input terminal and the negative-voltage input terminal of the semiconductor switching circuit 5 (hereinafter referred to as a P-N short circuit) has occurred, and the three-phase main relay 3 and the two-phase relay 8 are shut off, thereby preventing a secondary failure from occurring.

On the other hand, if the P-N short circuit is not detected, the upper arm transistors 5a, 5c, 5e of the semiconductor switching circuit 5 are switched on, and then the overcurrent detector circuit 6 again detects whether an excess current exists. If an excess current is now detected, it is judged that a ground fault has taken place, and the switching control section switches off the upper arm transistors 5a, 5c, 5e of the semiconductor switching circuit 5 and also shuts off the three-phase main relay 3 and the two-phase relay 8.

When no ground fault has occurred, switching on only the upper arm transistors 5a, 5c, 5e does not cause currents to flow into the semiconductor switching circuit 5.

Instead of turning on the upper arm transistors in the U, V and W phases at the same time for this ground fault detection as described above, whether or not a ground fault has occurred may also be judged by switching on the upper arm transistors in the U, V and W phases in sequence to examine whether a ground fault has occurred in any of the phases.

When the P-N short circuit and the ground fault are not detected, the semiconductor switching circuit 5 is operated to enter an actual operating state for causing currents to flow in the motor 7.

With the conventional device described above, a problem exists. Specifically, there is no detection of whether the upper or lower arm transistor in the semiconductor switching circuit 5 has short circuited until after an excess current has been detected by the overcurrent detector 6. Thus, the semiconductor switching circuit 5 may endure a high current load.

Further, since the known inverter apparatus and inverter controlling method having protective functions are arranged as described above, large currents flow in the upper arm transistors 5a, 5c, 5e and lower arm transistors 5b, 5d, 5f when a ground fault and a transistor fault are detected. Therefore, the transistors are capable of being damaged and/or stressed.

Also, since a P-N impedance fault is not detected until an overcurrent state actually occurs, the semiconductor switching circuit 5 or circuit parts connected thereto cannot be protected and are therefore susceptible to being damaged and/or stressed. In this situation, the control input of each transistor is set so as to keep the transistors off.

Still further, according to the conventional device described above, it is difficult to troubleshoot the fault. That is, it is difficult to detect whether a fault is a P-N impedance fault, a ground fault or a fault occurring in one of the transistors. Further, if it is a fault occurring in one of the transistors, it is difficult to know which of the transistors is faulty.

SUMMARY OF THE INVENTION

It is therefore an object of the present invention to overcome the disadvantages in the prior art discussed above.

Specifically, it is an object of the invention to provide an inverter apparatus and an inverter controlling method which prevent transistors from being damaged and stressed.

It is another object of the invention to provide an apparatus and method which allow a fault to be identified specifically so as to aid in troubleshooting.

These and other objects are provided by the present invention which involves the recognition that the voltage across the charging capacitor 4 can be measured and detected over a period of time and that this measuring and detecting of the voltage across the capacitor can be used in order to detect faults. Specifically, if the voltage across the capacitor is lower than a predetermined voltage, a P-N impedance fault can be detected. Further, if the voltage across the capacitor rises at a higher rate than a predetermined rate, a ground fault can be detected. Still further, a faulty transistor can be detected if the voltage across the capacitor lowers. Thus, by closely monitoring the voltage and change in voltage across the smoothing capacitor 4, faults can be quickly identified so as to enable quick troubleshooting. Still further, the faults are detected without stressing the transistors in the semiconductor switching circuit 5 since the faults are detected by the voltage across the smoothing capacitor 4 which is located in parallel to the semiconductor switch 5. On the other hand, in the prior art of FIG. 6, the overcurrent detector circuit 6 was located in series with the semiconductor switch 5. Thus, in the prior art, if an overcurrent was flowing through the overcurrent detector 6, that same high overcurrent would flow through the semiconductor switch 5, thereby stressing the transistors in the switch 5.

The present invention makes it unnecessary to have high currents flow through the semiconductor switch circuit 5, thus avoiding stress to the transistors, and also avoiding the eventual damage to the transistor elements.

Further, the invention makes it possible to specifically know what type of fault is present simply by monitoring the voltage and voltage change across the charging capacitor.

DETAILED DESCRIPTION OF THE PREFERRED EMBODIMENTS

Figure 1:
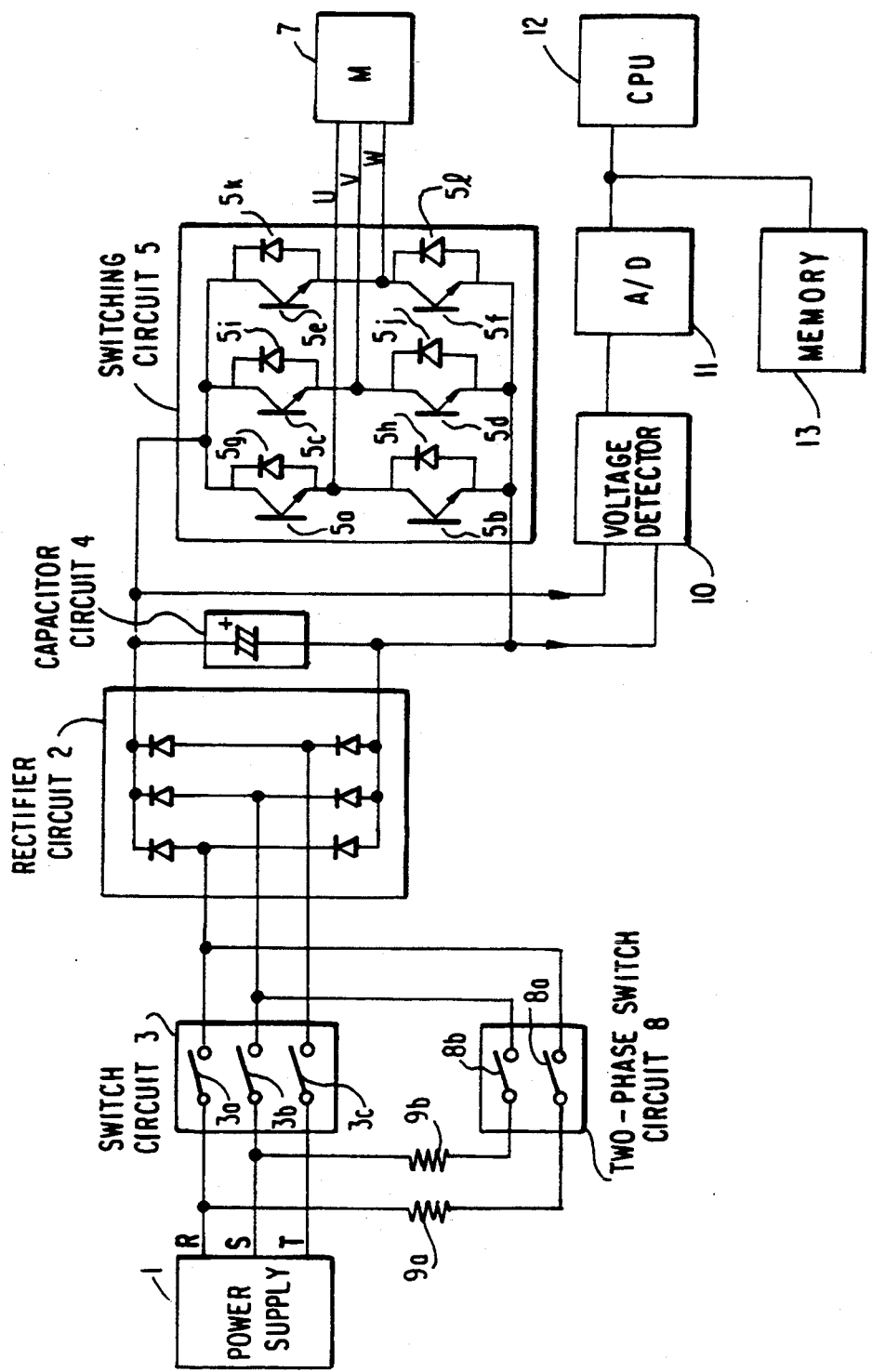
FIG. 1 is a block diagram illustrating an inverter apparatus according to a preferred embodiment of the present invention.

FIG. 1 is a block diagram showing an inverter apparatus illustrating an embodiment of the present invention.

Figure 6:
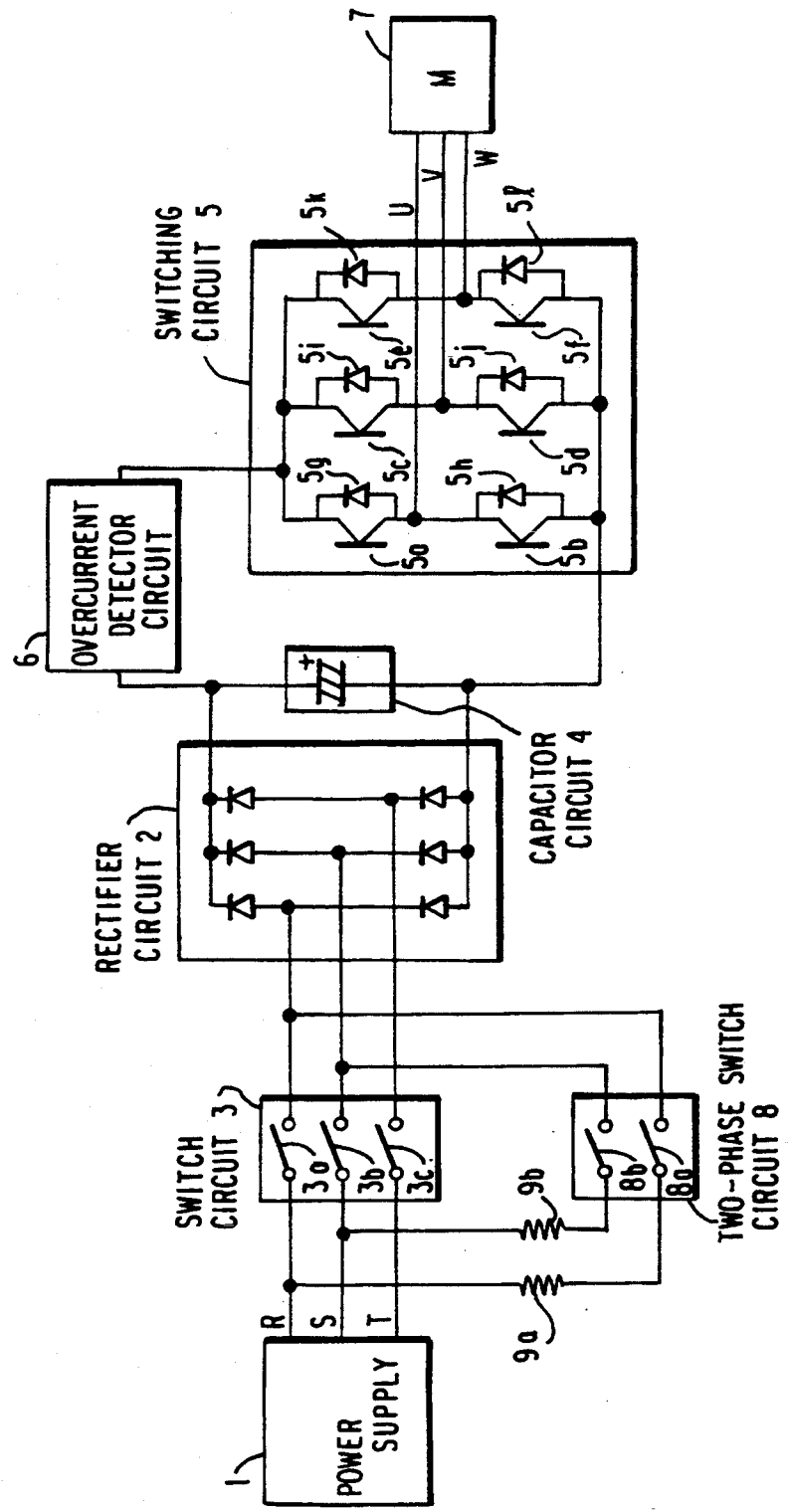
FIG. 6 is a block diagram illustrating an inverter apparatus according to the prior art.

In FIG. 1, the numerals 1-5, 7 and 8 are identical to those in FIG. 6 showing the prior art apparatus. It should be noted that the overcurrent detector circuit 6 employed in the prior art apparatus for detecting an excess current that may flow into the semiconductor switching circuit 5 is not used in FIG. 1.

Reference numeral 10 indicates a voltage detector circuit for detecting a voltage developed across the smoothing capacitor 4 and for outputting a voltage proportional to the voltage across the smoothing capacitor 4. Reference numeral 11 indicates an analog-to-digital converter for converting the voltage detected by the voltage detector circuit 10 into a digital value. Reference numeral 12 indicates a CPU for performing predetermined operation processing on the basis of data output from the analog-to-digital converter 11. Finally, reference numeral 13 indicates a memory connected to the CPU, for storing data used during processing.

The operation of the first embodiment of the present invention will now be described in accordance with the flowchart shown in FIG. 2. First, at step S201, the two-phase relay 8 is turned on. This indicates the beginning of charging of the capacitor 4. At step S202, the following operation is performed. First, an analog voltage proportional to the voltage across the smoothing capacitor 4 output from the voltage detector circuit 10 is input to the analog-to-digital converter 11, which then converts the input analog voltage into a digital value and outputs the digital value to the CPU 12. The analog-to-digital converter 11 may also be designed to perform analog-to-digital conversion under the control of the CPU 12.

The CPU 12 carries out a sampling operation which, at predetermined time intervals, reads a voltage Vc as the digital output of the analog-to-digital converter 11 and stores the value Vc into the memory 13 together with the value t of a time difference from the point when the two-phase relay 8 has been turned on to when Vc is read.

This sampling operation is performed for a length of time which is approximately three to five times longer than a charging time constant in a situation where the P-N impedance fault does not occur. When the sampling ends, the execution progresses to step S203.

At step S203, the CPU 12 checks to see whether or not the final value Vce of the voltage Vc is higher than a predetermined permissible minimum voltage Vmin on the basis of the sample data stored in the memory 13 by the sampling operation which took place at step S202. If the final value Vce is lower than the permissible minimum voltage Vmin, it is assumed that a P-N short circuit or a P-N impedance fault has occurred. The execution then advances to step S204 where the CPU 12 generates a P-N impedance fault alarm and goes to a final step S214 without turning on the three-phase main relay 3. If there is no fault, the execution moves on to step S205.

Figure 4:
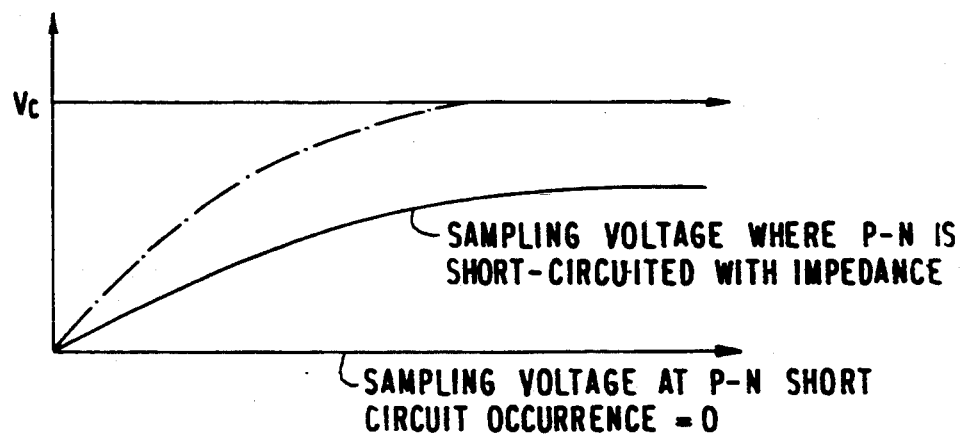
FIG. 4 illustrates a sampling voltage while the smoothing capacitor is being charged at the time of P-N impedance fault occurrence.

FIG. 4 shows a graph for describing the P-N impedance fault detection. The ordinate represents the converter output voltage (sampling voltage) and the abscissa represents time. If a P-N short circuit has taken place, as shown in FIG. 4, the voltage Vc does not rise at all, as indicated by the voltage line lying along the positive abscissa. If, when off, the semiconductor switching circuit 5 has a predetermined low impedance value, the final value Vce does not reach a predetermined target value Vt.

At step S205, the CPU 12 calculates a time t from when the two-phase relay 8 has been switched on until when the voltage across the smoothing capacitor 4 reaches a voltage which is 0.63 times the final value Vce on the basis of the data sampled in the step S202.

At step S206, the time t is subtracted from the time t calculated in the step S205. The time $t_r$ is a time constant for capacitor charging for a case where a ground fault does not occur. It is also determined at step S206 whether the absolute value of the subtraction result is within a permissible charging time constant error ta. It is judged that the ground fault has occurred if the subtraction result is not within ta. Then, execution advances to step S207 where a ground fault alarm is generated and execution then proceeds to step S214 without turning on the three-phase main relay 3.

On the other hand, if the subtraction result is within the permissible charging time constant error ta, it is judged that no ground fault has taken place and the execution progresses to a next step S208.

The reason why the ground fault can be judged in the step S206 will now be described for a case where, for example, in FIG. 1, the S phase of the three-phase alternating-current power supply 1 is a ground phase and thus, the U phase input to the motor 7 results in a ground fault.

Before the three-phase main relay 3 is turned on, the two-phase relay 8 is first switched on. At this time, from alternating currents output from the R and S phases of the three-phase alternating-current power supply 1, voltages are imposed upon the smoothing capacitor 4 to charge the smoothing capacitor 4. These voltages are rectified first by a bridge circuit comprising two diodes included in the rectifier circuit 2, the flywheel diode 5g connected in antiparallel with the upper arm transistor 5a in the U phase, and the flywheel diode 5h connected in antiparallel with the lower arm transistor 5b in the U phase. The charging current is limited by the resistor 9a but is not limited by the resistor 9b.

When a ground fault has not taken place, voltages rectified by a bridge circuit comprising four diodes included in the rectifier circuit 2 are applied to the smoothing capacitor 4 to charge the capacitor 4. Limited by the resistors 9a and 9b in this case, the charging currents are limited to a smaller value as compared to the case described above where the ground fault has occurred.

Figure 3:
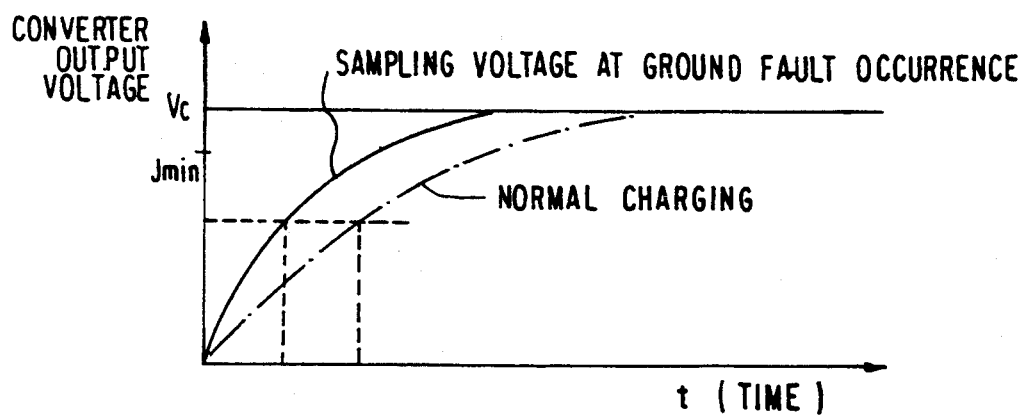
FIG. 3 illustrates a sampling voltage while a smoothing capacitor is being charged at the time of ground fault occurrence.

Therefore, when the ground fault has taken place, the smoothing capacitor 4 is charged at a smaller time constant t, as shown in FIG. 3, than where the ground fault has not occurred (time constant t). That is, whether or not the time constant is smaller than the one where the ground fault has not occurred is determined in step S206, whereby the presence or absence of the ground fault can be judged.

In FIG. 3, the ordinate is the converter output voltage, and the abscissa is time. The higher curve in FIG. 3 indicates the situation where the capacitor charges too quickly, and thus a ground fault has occurred. The lower curve indicates the normal capacitor charging rate, indicating that there is no ground fault.

The ground fault judgment may also be made in an identical manner if the ground fault is other than the S phase and a ground fault has occurred in other than the U phase. The above-described example is only for illustrative purposes.

Figure 2:
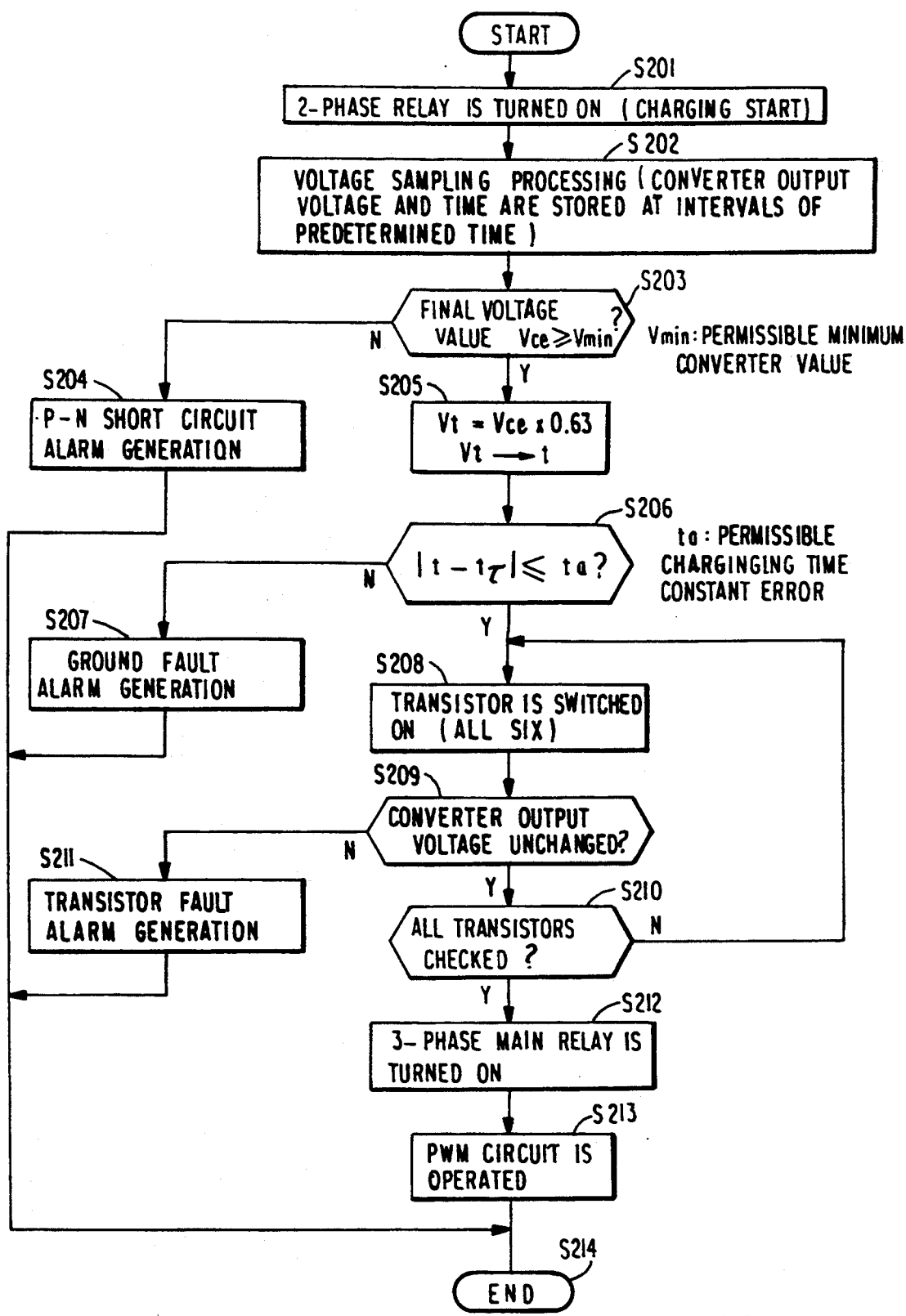
FIG. 2 is a flowchart illustrating the operation of the preferred embodiment of the present invention shown in FIG. 1.

Returning to the flowchart of FIG. 2, in steps S208 to S210, each of the upper arm transistors 5a, 5c, 5e and the lower arm transistors 5b, 5d, 5f of the semiconductor switching circuit 5 is examined one-by-one to determine whether or not a short circuit fault has occurred in any one of the transistors.

Specifically, at step S208, the two-phase relay 8 is switched off, the smoothing capacitor 4 is then discharged by a discharge circuit (not shown), the two-phase relay 8 is turned on again, and the smoothing capacitor 4 is charged via the resistors 9a, 9b. While the smoothing capacitor 4 is being charged, the CPU 12 switches on any one of the upper arm transistors 5a, 5c, 5e and the lower arm transistors 5b, 5d, 5f in the semiconductor switching circuit 5, and the execution advances to the next step S209.

At step S209, it is detected whether or not the voltage across the smoothing capacitor 4 decreases. If it does not decrease, it is determined that the other arm transistor in the same phase as the transistor currently switched on is normal, and the execution progresses to the next step S210. If the voltage has decreased, the other transistor is judged to be faulty and the processing advances to step S211 where an alarm is set or sounded indicating that the transistor is faulty. Then, the execution proceeds to step S214 without the three-phase main relay 3 being turned on. That is, at step S208 one of the transistors is turned on. For example, transistor 5a may be turned on. Then, it is detected whether or not the voltage across the smoothing capacitor 4 has decreased. If this voltage has not decreased, it is determined then that transistor 5b, the other arm transistor in the same phase as the transistor 5a, is normal and not faulty. If the voltage has decreased, it is judged that the transistor 5b is faulty.

In step S210, it is determined whether or not all six transistors have been judged. If the transistor judgment process is not yet complete, the execution returns to step S208 to check the next transistor. If it is complete, the execution goes on to step S212.

In step S212, it is determined that neither a P-N short circuit, ground fault nor transistor fault has occurred, and thus the three-phase main relay 3 is turned on, and the execution progresses to step S213.

In step S213, the switching control section operates the PWM circuit to enter a normal, actual operation state. In this state, the PWM circuit drives the motor 7 connected thereto. When the actual operation ends, the processing advances to the final step S214, where predetermined termination processing is carried out.

By executing step S208 at a time when the voltage across the smoothing capacitor 4 is low, the circuit is hardly stressed if a short circuit failure has occurred.

Further, the judgment carried out in steps S208 to S210 may be made, alternatively, using the data sampled in step S202, without the smoothing capacitor 4 being discharged. In this case, however, the operations of steps S208 and S210 must be performed in step S202. Also, sampling by charging the smoothing capacitor 4 will make it slightly difficult to differentiate between the transistor fault and the ground fault.

Further, the judgments in the steps S203 and S206 made on the basis of the data sampled in the step S202 may also be performed directly using the output voltage of the converter.

Another embodiment of the present invention will now be described. The resistor circuit inserted in two phases of the three-phase alternating current circuit in the embodiment described above may also be inserted between the rectification output of the rectifier circuit 2 and the input of the semiconductor switching circuit 5 in order to make identical fault judgments. A block diagram for this embodiment is shown in FIG. 5.

Figure 5:
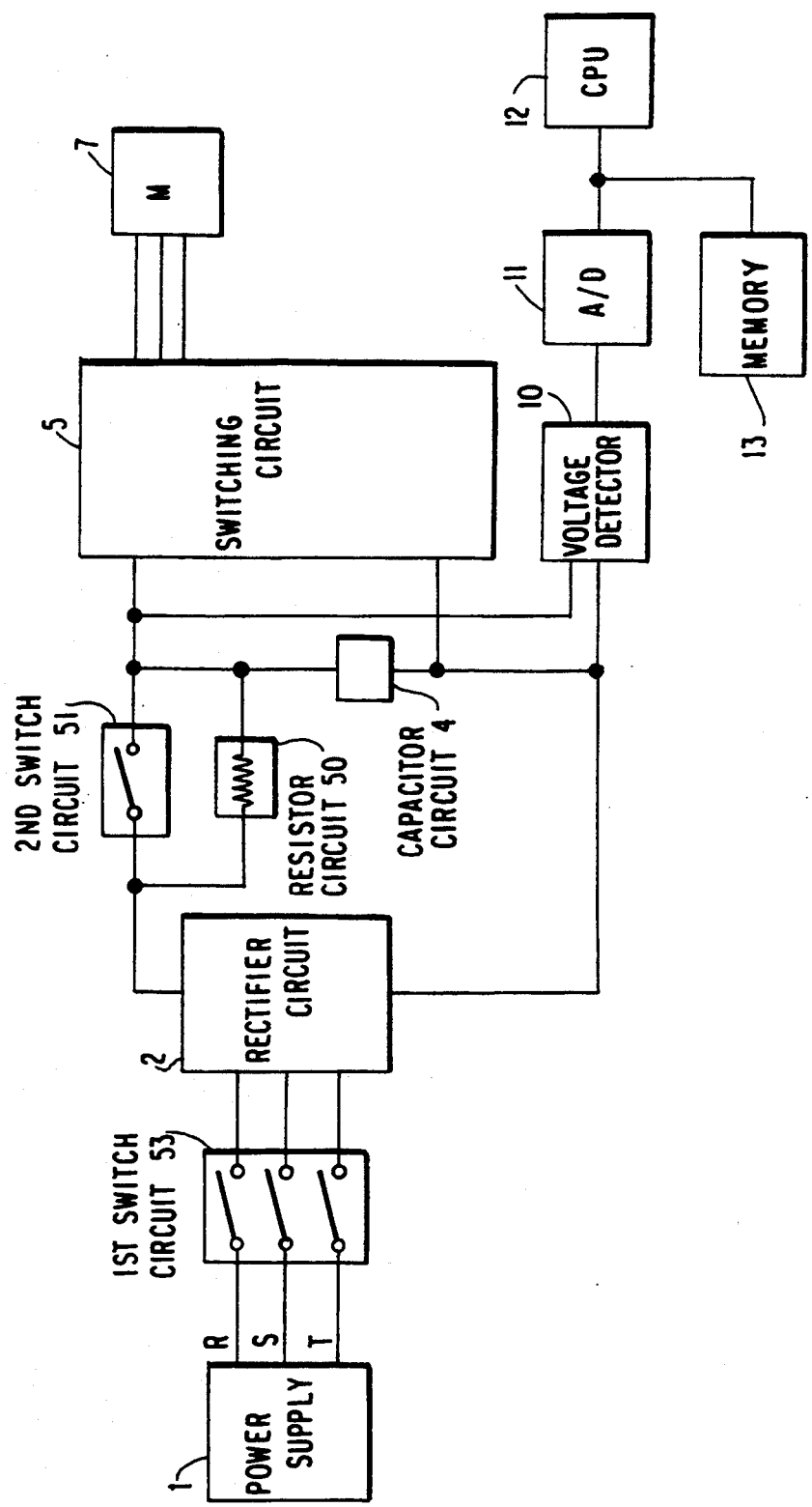
FIG. 5 is a block diagram illustrating an inverter apparatus according to another preferred embodiment of the present invention.

In FIG. 5, 50 indicates a resistor circuit inserted between the rectification output of the rectifier circuit 2 and the input of the semiconductor switching circuit 5.

Reference numerals 1, 2, 4, 5, 7 and 10–13 are identical to those in FIG. 1. Reference numeral 53 indicates a first switch circuit identical to the three-phase main relay 3 in FIG. 1, and 51 represents a second switch circuit, for example, a relay, for short-circuiting the resistor circuit 50. This relay 51 is turned on when no fault has been detected, and after the relay 51 is switched on, the PWM circuit is placed into the actual operation state. Thus, the resistor 50, and its associated path, are only used during fault detection. This is similar to the FIG. 1 situation in which the two-phase switch circuit 8 is only used during fault detection.

If the resistor circuit 50 is inserted in only the positive-voltage side rectification output as shown in FIG. 5, a ground fault current cannot be limited. To limit the ground fault current, a resistor must also be inserted in the negative-voltage side rectification output.

The CPU 12, the memory 13, etc., in either of the two embodiments described above, are generally employed to control the PWM circuit and may either be partially used or time-shared with other applications. Thus, the present invention can be carried out without greatly increasing the cost of a pre-existing system.

The above-described embodiments are only disclosed for illustrative purposes and are not intended to limit the spirit and scope of the invention. The invention is only to be limited by the scope of the appended claims.

What is claimed is:

1. An inverter apparatus comprising:
   a rectifier circuit for rectifying three-phase alternating currents;
   a three-phase switch circuit for connecting or disconnecting a three-phase alternating current power supply and input terminals of said rectifier circuit;
   a smoothing capacitor circuit for smoothing the rectified outputs of said rectifier circuit;
   a PWM circuit for receiving the smoothing output of said smoothing capacitor circuit and outputting PWM-modulated three-phase alternating currents;
   a two-phase switch circuit of which two phase terminals on one end are connected to two phase terminals on one end of said three-phase switch circuit;
   a resistor circuit of which one end is connected to two phase terminals on the other end of said two-phase switch circuit and of which the other end is connected to two phase terminals on the other end of said three-phase switch circuit for limiting the magnitude of currents flowing in respective phases of said two-phase switch circuit;
   impedance judging means for judging that when an upper arm transistor and a lower arm transistor in each phase of said PWM circuit are all off and said three-phase switch circuit is open, impedance between the input terminals of the PWM circuit is abnormal if the magnitude of a voltage across said smoothing capacitor after said two-phase switch circuit is turned on is lower than a predetermined voltage, and judging that the impedance is normal if the magnitude of said voltage is higher than the predetermined voltage; and
   switch controlling means for turning on said three-phase switch circuit when said impedance judging means has judged that the impedance is normal.

2. An inverter apparatus comprising:
   a rectifier circuit for rectifying three-phase alternating currents;
   a three-phase switch circuit for connecting or disconnecting a three-phase alternating current power supply and input terminals of said rectifier circuit;
   a smoothing capacitor circuit for smoothing the rectified outputs of said rectifier circuit;
   a PWM circuit for receiving the smoothed output of said smoothing capacitor circuit and outputting PWM-modulated three-phase alternating currents;
   a two-phase switch circuit of which two phase terminals on one end are connected to two phase terminals on one end of said three-phase switch circuit;
   a resistor circuit of which one end is connected to two phase terminals on the other end of said two-phase switch circuit and of which the other end is connected to two phase terminals on the other end of said three-phase switch circuit for limiting the magnitude of currents flowing in respective phases of said two-phase switch circuit;
   ground fault judging means for judging that when an upper arm transistor and a lower arm transistor in each phase of said PWM circuit are all off and said three-phase switch circuit is open, a ground fault has occurred if a voltage across said smoothing capacitor circuit after said two-phase switch circuit is turned on rises at a higher rate than a predetermined rate, and judging that a ground fault has not occurred if said voltage rises at a lower rate than the predetermined rate; and
   switch controlling means for turning on said three-phase switch circuit when said ground fault judging means has judged that a ground fault has not occurred.

3. An inverter apparatus comprising:
   a rectifier circuit for rectifying three-phase alternating currents;
   a three-phase switch circuit for connecting or disconnecting a three-phase alternating current power supply and input terminals of said rectifier circuit;
   a smoothing capacitor circuit for smoothing the rectified outputs of said rectifier circuit;
   a PWM circuit for receiving the smoothed output of said smoothing capacitor circuit and outputting PWM-modulated three-phase alternating currents;

a two-phase switch circuit of which two phase terminals on one end are connected to two phase terminals on one end of said three-phase switch circuit;

a resistor circuit of which one end is connected to two phase terminals on the other end of said two-phase switch circuit and of which the other end is connected to two phase terminals on the other end of said three-phase switch circuit for limiting the magnitude of currents flowing in respective phases of said two-phase switch circuit;

transistor judging means for causing, when an upper arm transistor and a lower arm transistor in each phase of said PWM circuit are all off and said three-phase switch circuit is open, one of a series-connected upper arm transistor and a lower arm transistor in said PWM circuit to turn on while said smoothing capacitor is being charged after said two-phase switch circuit has been turned on, and judging that one of said series-connected upper arm transistor and lower arm transistor which is not on is faulty if a voltage across said smoothing capacitor lowers, and judging that the transistor is normal if said voltage does not lower; and switch controlling means for turning on said three-phase switch circuit when said transistor judging means has judged that the transistor is normal.

4. An inverter controlling method comprising the steps of:

before a three-phase switch circuit for connecting or disconnecting a three-phase alternating-current power supply and the input terminals of a rectifier circuit is turned on, causing a switch controlling means to turn on a two-phase switch circuit connected in parallel with two phase switches of said three-phase switch circuit via a resistor circuit, applying a rectification output rectified by said rectifier circuit across a smoothing capacitor, and inputting a voltage across said smoothing capacitor to a PWM circuit of which a series-connected upper arm transistor and lower arm transistor in each of the three phases are all off;

causing an impedance judging means to judge that an impedance between the input terminals of said PWM circuit is abnormal if the voltage across said smoothing capacitor circuit after said two-phase switch circuit is turned on is lower than a predetermined voltage, and to judge that the impedance is normal if-said voltage is higher than the predetermined voltage; and causing said switch controlling means to turn on said three-phase switch circuit when said impedance judging means has judged that the impedance is normal.

5. An inverter controlling method comprising the steps of:

before a three-phase switch circuit for connecting or disconnecting a three-phase alternating-current power supply and the input terminals of a rectifier circuit is turned on, causing a switch controlling means to turn on a two-phase switch circuit connected in parallel with two phase switches of said three-phase switch circuit via a resistor circuit, applying a rectification output rectified by said rectifier circuit across a smoothing capacitor, and inputting a voltage across said smoothing capacitor to a PWM circuit of which a series-connected upper arm transistor and lower arm transistor in each of the three phases are all off;

causing a ground fault judging means to judge, when said three-phase switch circuit is off, that a ground fault has occurred if the voltage across said smoothing capacitor circuit after said two-phase switch circuit is turned on rises at a higher rate than a predetermined rate, and to judge that a ground fault has not occurred if said voltage rises at a lower rate than the predetermined rate; and causing said switch controlling means to turn on said three-phase switch circuit when said ground fault judging means has judged that a ground fault has not occurred.

6. An inverter controlling method comprising the steps of:

before a three-phase switch circuit for connecting or disconnecting a three-phase alternating-current power supply and the input terminals of a rectifier circuit is turned on, causing a switch controlling means to turn on a two-phase switch circuit connected in parallel with two phase switches of said three-phase switch circuit via a resistor circuit, applying a rectification output rectified by said rectifier circuit across a smoothing capacitor, and inputting a voltage across said smoothing capacitor to a PWM circuit of which a series-connected upper arm transistor and lower arm transistor in each of the three phases are all off;

causing a transistor judging means to turn on one of the series-connected upper arm transistor and lower arm transistor of a phase in said PWM circuit while said smoothing capacitor is being charged after said two-phase switch circuit has been turned on, and to judge that one of said upper arm transistor and lower arm transistor which is not on is faulty if the voltage across said smoothing capacitor lowers, and to judge that the transistor is normal if said voltage does not lower; and causing said switch controlling means to turn on said three-phase switch circuit when said transistor judging means had judged that the transistor is normal.

7. An inverter apparatus comprising:

a rectifier circuit for rectifying three-phase alternating currents input from a three-phase alternating-current power supply;

a first switch circuit for opening and closing current paths between said three-phase alternating current power supply and said rectifier circuit;

a smoothing capacitor circuit for smoothing the rectified outputs of said rectifier circuit;

a second switch circuit for opening and closing a current path between said rectifier circuit and said smoothing capacitor circuit;

a PWM circuit for receiving the smoothed output of said smoothing capacitor circuit and outputting PWM-modulated three-phase alternating currents;

a resistor circuit connected in parallel with said second switch circuit;

impedance judging means for judging that when an upper arm transistor and a lower arm transistor in each phase of said PWM circuit are all off and said second switch circuit is off, an impedance between the input terminals of the PWM circuit is abnormal if the magnitude of a voltage across said smoothing capacitor circuit after said first switch circuit is turned on is lower than a predetermined voltage, and judging that the impedance is normal if the magnitude of said voltage is higher than the predetermined voltage; and switch controlling means for turning on said second switch circuit when said impedance judging means has judged that the impedance is normal.

8. An inverter apparatus comprising:

a rectifier circuit for rectifying three-phase alternating currents input from a three-phase alternating-current power supply;

a first switch circuit for opening and closing current paths between said three-phase alternating current power supply and said rectifier circuit;

a smoothing capacitor circuit for smoothing the rectified outputs of said rectifier circuit;

a second switch circuit for opening and closing a current path between said rectifier circuit and said smoothing capacitor circuit;

a PWM circuit for receiving the smoothing output of said smoothing capacitor circuit and outputting PWM-modulated three-phase alternating currents;

a resistor circuit connected in parallel with said second switch circuit;

ground fault judging means for judging that when an upper arm transistor and a lower arm transistor in each phase of said PWM circuit are all off and said second switch circuit is off, a ground fault has occurred if a voltage across said smoothing capacitor circuit after said first switch circuit is turned on rises at a higher rate than a predetermined rate, and judging that a ground fault has not occurred if said voltage rises at a lower rate than the predetermined rate; and switch controlling means for turning on said second switch circuit when said ground fault judging means has judged that a ground fault has not occurred.

9. An inverter apparatus comprising:

a rectifier circuit for rectifying three-phase alternating currents input from a three-phase alternating-current power supply;

a first switch circuit for opening and closing current paths between said three-phase alternating current power supply and said rectifier circuit;

a smoothing capacitor circuit for smoothing the rectified outputs of said rectifier circuit;

a second switch circuit for opening and closing a current path between said rectifier circuit and said smoothing capacitor circuit;

a PWM circuit for receiving the smoothing output of said smoothing capacitor circuit and outputting PWM-modulated three-phase alternating currents;

a resistor circuit connected in parallel with said second switch circuit;

transistor judging means for causing, when an upper arm transistor and a lower arm transistor in each phase of said PWM circuit are off and said second switch circuit is off, either of a series-connected upper arm transistor and a series-connected lower arm transistor in a phase in said PWM circuit to turn on while said smoothing capacitor is being charged after said first switch circuit has been turned on, and judging that either said upper arm transistor or lower arm transistor which is not on is faulty if a voltage across said smoothing capacitor circuit lowers, and judging that the transistor is normal if said voltage does not lower; and switch controlling means for turning on said second switch circuit when said transistor judging means has judged that the transistor is normal.

10. An inverter controlling method comprising the steps of:

when a first switch circuit for opening and closing current paths between a three-phase alternating-current power supply and a rectifier circuit for rectifying three-phase alternating currents supplied from said three-phase alternating-current power supply and a second switch circuit connected in parallel with a resistor circuit which limits a current flowing in a current path between the output of said rectifier circuit and a smoothing capacitor circuit are both off, causing switch controlling means to turn on said first switch circuit, charging said smoothing capacitor circuit via said resistor circuit, and inputting a voltage across said smoothing capacitor circuit to a PWM circuit of which upper arm transistors and lower arm transistors in each phase are off;

causing an impedance judging means to judge that an impedance between the input terminals of said PWM circuit is abnormal if the voltage across said smoothing capacitor circuit after said first switch circuit is turned on is lower than a predetermined voltage, and to judge that the impedance is normal if said voltage is higher than the predetermined voltage; and causing said switch controlling means to turn on said second switch circuit when said impedance judging means has judged that the impedance is normal.

11. An inverter controlling method comprising the steps of:

when a first switch circuit for opening and closing current paths between a three-phase alternating-current power supply and a rectifier circuit for rectifying three-phase alternating currents supplied from said three-phase alternating-current power supply and a second switch circuit connected in parallel with a resistor circuit which limits a current flowing in a current path between the output of said rectifier circuit and a smoothing capacitor circuit are both off, causing switch controlling means to turn on said first switch circuit, charging said smoothing capacitor circuit via said resistor circuit, and inputting a voltage across said smoothing capacitor circuit to a PWM circuit of which upper arm transistors and lower arm transistors in each phase are off;

causing a ground fault judging means to judge that a ground fault has occurred if the voltage across said smoothing capacitor circuit after said first switch circuit is turned on rises at a higher rate than a predetermined rate, and to judge that a ground fault has not occurred if said voltage rises at a lower rate than the predetermined rate; and causing said switch controlling means to turn on said second switch circuit when said ground fault judging means has judged that a ground fault has not occurred.

12. An inverter controlling method comprising the steps of:

when a first switch circuit for opening and closing current paths between a three-phase alternating-current power supply and a rectifier circuit for rectifying three-phase alternating currents supplied from said three-phase alternating-current power supply and a second switch circuit connected in parallel with a resistor circuit which limits a current flowing in a current path between the output of said rectifier circuit and a smoothing capacitor circuit are both off, causing switch controlling means to turn on said first switch circuit, charging said smoothing capacitor circuit via said resistor circuit, and inputting a voltage across said smoothing capacitor circuit to a PWM circuit of which upper arm transistors and lower arm transistors in each phase are off;

causing a transistor judging means to turn on either of a series-connected upper arm transistor and a series-connected lower arm transistor in a phase in said PWM circuit while said smoothing capacitor is being charged after said first switch circuit has been turned on, and to judge that either said upper arm transistor or lower arm transistor which is not on is faulty if the voltage across said smoothing capacitor lowers, and to judge that the transistor is normal if said voltage does not lower; and causing said switch controlling means to turn on said second switch circuit when said transistor judging means has judged that the transistor is normal.

* * * * *